United States Patent
Chivers et al.

(10) Patent No.: US 8,630,357 B2
(45) Date of Patent: Jan. 14, 2014

(54) ULTRA-WIDEBAND DUAL BAND MAGNITUDE SUMMER APPARATUS AND METHOD

(75) Inventors: Mark A. Chivers, McKinney, TX (US); Sujit Ravindran, McKinney, TX (US)

(73) Assignee: ABG Tag & Traq, LLC, Oklahoma City, OK (US)

( * ) Notice: Subject to any disclaimer, the term of this patent is extended or adjusted under 35 U.S.C. 154(b) by 201 days.

(21) Appl. No.: 13/374,386

(22) Filed: Dec. 23, 2011

(65) Prior Publication Data

US 2012/0201274 A1    Aug. 9, 2012

Related U.S. Application Data

(60) Provisional application No. 61/462,618, filed on Feb. 7, 2011.

(51) Int. Cl.
*H04L 27/00* (2006.01)

(52) U.S. Cl.
USPC .............. 375/256; 375/347; 375/340; 342/21

(58) Field of Classification Search
USPC ......... 375/130, 147, 256, 259, 260, 316, 340, 375/377; 342/20, 21, 58
See application file for complete search history.

(56) References Cited

U.S. PATENT DOCUMENTS

| | | | |
|---|---|---|---|
| 7,733,229 B2 | 6/2010 | Reunamaki | |
| 8,138,969 B2* | 3/2012 | Huggett et al. | ............... 342/194 |
| 2010/0103989 A1* | 4/2010 | Smith et al. | ................... 375/150 |

* cited by examiner

*Primary Examiner* — Dac Ha
(74) *Attorney, Agent, or Firm* — William M. Hobby, III

(57) ABSTRACT

This invention relates to capturing and processing the full bandwidth of an Ultra-Wideband (UWB) signal. An incoming UWB signal is processed in two different analog signal bands in parallel and their magnitudes summed to facilitate a Field programmable gate array (FPGA) processing of the entire UWB bandwidth to minimize digital implementation loss and promote a higher range.

20 Claims, 2 Drawing Sheets

ULTRA-WIDEBAND DUAL BAND MAGNITUDE SUMMER APPARATUS AND METHOD

This Application claims the benefit of U.S. Provisional Application No. 61/462,618, filed Feb. 7, 2011 for Ultra Wide-Band Dual Band Magnitude Summer Apparatus.

BACKGROUND OF THE INVENTION

This invention relates to capturing and processing the full bandwidth of an Ultra-Wideband (UWB) signal and especially to processing an incoming UWB signal in two different bands in parallel and thereafter summing their respective magnitudes.

Ultra-wideband (UWB) communication systems employ very short pulses of electromagnetic radiation or impulses with short rise and fall times which results in a spectrum with a very wide bandwidth. UWB communications have a number of advantages over conventional systems. The very large bandwidth for instance facilitates very high data rate communications. Since ultra short pulses of radiation are employed, the average transmit power may be kept low even though the power in each pulse is relatively large. Since the power in each pulse is spread over a large bandwidth, the power per unit frequency may be very low, allowing UWB systems to coexist with other spectrum users and providing a low probably of intercept. UWB techniques are attractive for short range wireless devices, such as radio frequency identification (RFID) systems, because they allow devices to exchange information at relatively high data rates. For instance, an Ultra Wideband Radio Frequency Identification Technique system may be seen in the Reunamaki U.S. Pat. No. 7,733,229. In this invention, UWB techniques are applied to RFID in which a reader generates a UWB IR interrogation signal and receives a UWB IR reply signal from an RFID tag in response to the interrogation signal.

Federal Communications Commission (FCC) defines a UWB pulse as one whose 10 dB bandwidth either is at least 500 MHz or whose fractional bandwidth is greater than 0.20. The 500 MHz minimum bandwidth limit sets a threshold at 2.5 GHz. Below this 2.5 GHz threshold, signals are considered UWB if their fractional bandwidth exceeds 0.20, while above the threshold signals are UWB if their bandwidth exceeds 500 MHz. Fractional bandwidth is defined as the ratio of the 10 dB bandwidth to the center frequency. For example, a 500 MHz 10 dB bandwidth UWB signal centered at 6 GHz has a fractional bandwidth of 0.083 ($500/6000$). For UWB whose center frequency is greater than 2.5 GHz, the 500 MHz 10 dB analog bandwidth needs to be processed.

In our past U.S. patent application Ser. No. 12/387,425; filed May 1, 2009, for Pulse-Level Interleaving for UWB Systems, a UWB transmitter transmits a multi-pulse per bit signal to a UWB receiver for multi-bit processing. A bit stream is transmitted using a plurality of UWB pulses for each bit frame. The pulse level interleaving of the pulses is accomplished prior to transmission of the signals by a plurality of UWB transmitters operating at the same time. The receiver de-interleaves the pulses and then aggregates the energy from the multiple pulses within each frame.

In order to realize the full gain of a 500 MHz analog bandwidth signal, data must be processed digitally at a rate of 1000 Msps. Unfortunately, 1000 Msps (or 500 Complex Msps→500 MHz complex digital bandwidth) is difficult to implement with most Field programmable gate arrays (FPGA). Therefore, a smaller digital bandwidth is used, which results in loss of signal strength.

$$\text{Loss(dB)} = 10 \times \log_{10}(\text{Analog Bandwidth/Complex Digital Bandwidth})$$

For example, an FPGA running at 320 Complex Msps can process only 320 MHz of analog bandwidth; therefore, if the received signal has 500 MHz of analog bandwidth, 1.94 dB is lost in FPGA digital implementation.

$$\text{Loss(dB)} = 10 \times \log_{10}(320 \text{ Msps}/500 \text{ MHz}) = -1.94 \text{ dB}$$

Range is a vital objective of any communications link, particularly in UWB asset tracking systems. The greater the net gain in a link budget, the greater the range. FCC imposes a power limit on UWB transmitters. Transmit power cannot be increased, unless bandwidth of the pulse is also increased proportionately. Therefore, in order to add gain to the link to maximize the range, while keeping the transmitter power and pulse repetition interval fixed, the receiver must process the entire bandwidth, thereby minimizing digital implementation loss and promoting higher range. The present invention processes nearly the entire bandwidth and minimizes digital implementation loss and promotes a higher range.

The present invention processes a UWB incoming signal in two different signal bands in parallel and then sums their magnitudes to facilitate the Field programmable gate array (FPGA) processing of the entire UWB bandwidth to thereby minimize digital implementation loss and promote a higher range.

BRIEF DESCRIPTION OF THE DRAWINGS

The accompanying drawings, which are included to provide further understanding of the invention and are incorporated in and constitute a part of the specification, illustrate an embodiment of the invention and together with the description, serve to explain the principles of the invention.

In the drawings.

DETAILED DESCRIPTION OF EXEMPLARY EMBODIMENT

This invention partitions the incoming signal into two channels. One channel processes one-half of the analog bandwidth by multiplying incoming digitized signal by one set of mixer coefficients; the second channel processes the remainder of the analog bandwidth by multiplying incoming digitized signal by another set of mixer coefficients. After a polyphase rate conversion is performed, each channel's complex outputs are fed into rectangular to polar converters. Each rectangular to polar converter outputs a magnitude vector that is the square root of the sum of the squares of the complex in-phase and quadrature (I/Q) inputs. For every I and Q sample, one magnitude sample is output. Therefore, 500 complex Msps translates to 500 real Msps. The magnitude outputs of the rectangular-to-polar converters are then summed. When compared to prior art single band polyphase rate conversion, the Signal to Noise Ratio (SNR) of the dual band magnitude summer increases by approximately 1.9 dB. The signal strength is increased by approximately 3.8 dB while the noise power is increased by approximately 1.9 dB.

Figure 1:
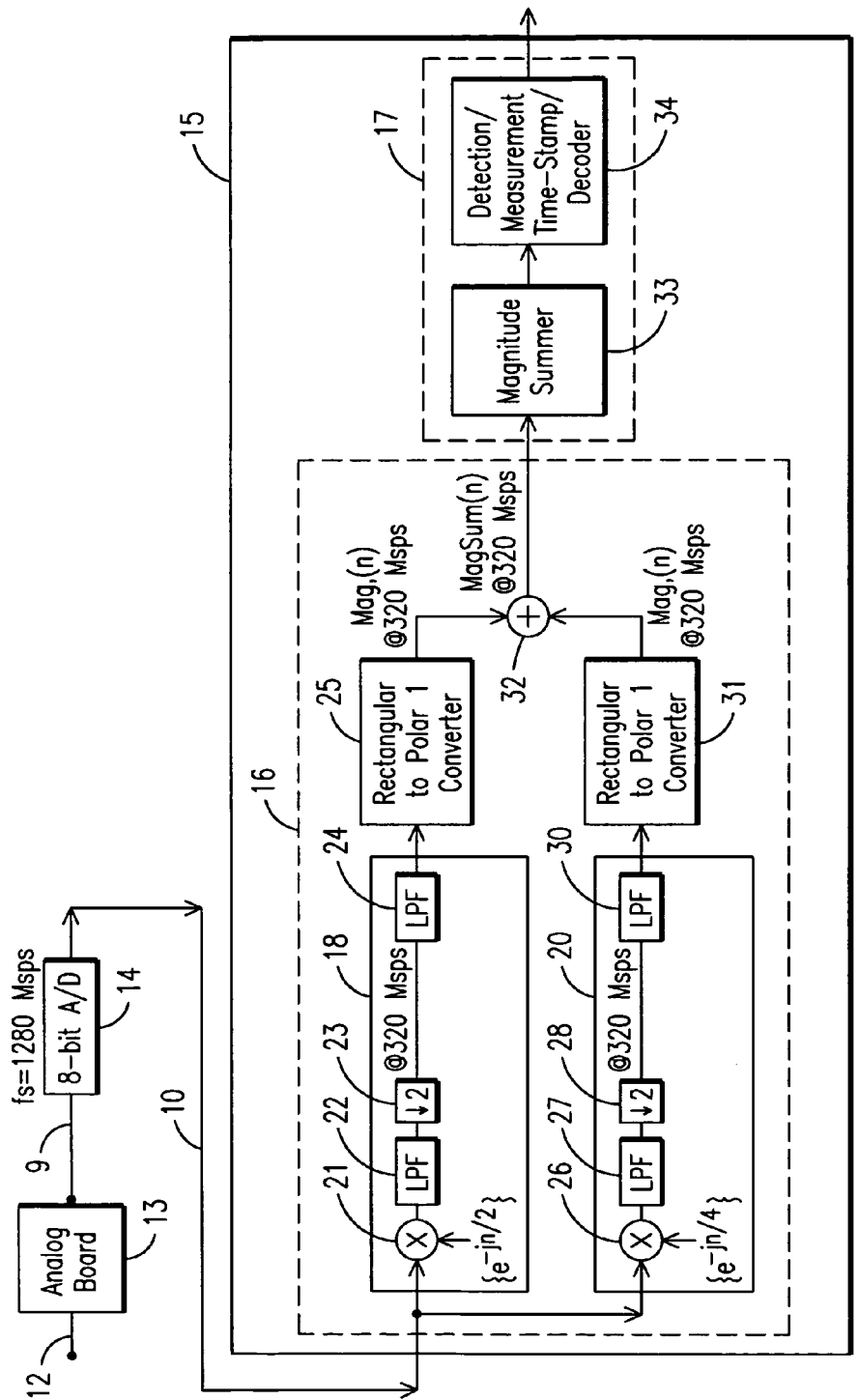
FIG. 1 is a block diagram of the of a dual band rate converter and magnitude summer in accordance with the present invention.

Referring to the drawings and especially to FIG. 1, a block diagram of the Ultra-Wideband Dual Band Magnitude Summer is shown. The incoming signal is sampled at 128OMsps.

One section processes one portion of the analog bandwidth, while the other section processes the remaining portion.

The signal from the receiver antenna is fed through line 12 directly into the Analog Board 13, where it is amplified, filtered, and then down-converted to an Intermediate Frequency (IF) centered at 320 MHz. The down-converted to IF signal output in line 9 is fed to an 8-bit Analog to Digital Converter (A/D) 14, where it is sampled at 1280 megasamples per second (Msps) and fed to the Field Programmable Gate Array (FPGA) 15 for digital signal processing.

In the FPGA, as seen in FIG. 1, the sampled IF signal is digitally processed in two primary digital signal processing (DSP) blocks 16 and 17. Block 16 is where the Dual Band rate conversion is performed. In the FIG. 1 diagram, identical 1280 Msps bit streams are input to two different rate conversion blocks: Rate Converter 18, and Rate Converter 20.

In rate converter 18, the signal is downshifted in frequency by 320 MHz and decimated by 2. The sampled signal entering rate converter 18 is applied to a 90 degree mixer 21 which mixes or downshifts the frequency by 320 MHz. The signal passes through a low pass filter (LPF) 22 and is down sampled 23 to 320 complex Msps before being applied to the LPF 24. The 320 Complex Msps signal is then applied to the Rectangular to Polar converter 25.

In rate converter 20, the signal is downshifted in frequency by 160 MHz and decimated by 2. The sampled signal entering rate converter 20 is applied to a 45 degree mixer 26 which mixes or downshifts the frequency by 160 MHz. The signal passes through a low pass filter (LPF) 27 and is down sampled 28 to 320 Complex Msps before being applied to the low pass filter (LPF) 30. The 320 Complex Msps signal is then applied to the rectangular to Polar converter 31.

In FIG. 1 the 320 Msps magnitude signals are combined in the summer 32 and applied to the Magnitude summer 33 in the DSP Block 17. The summed samples are then applied to the Detection/measurement/time-stamp/decoder circuit 34.

Figure 2:
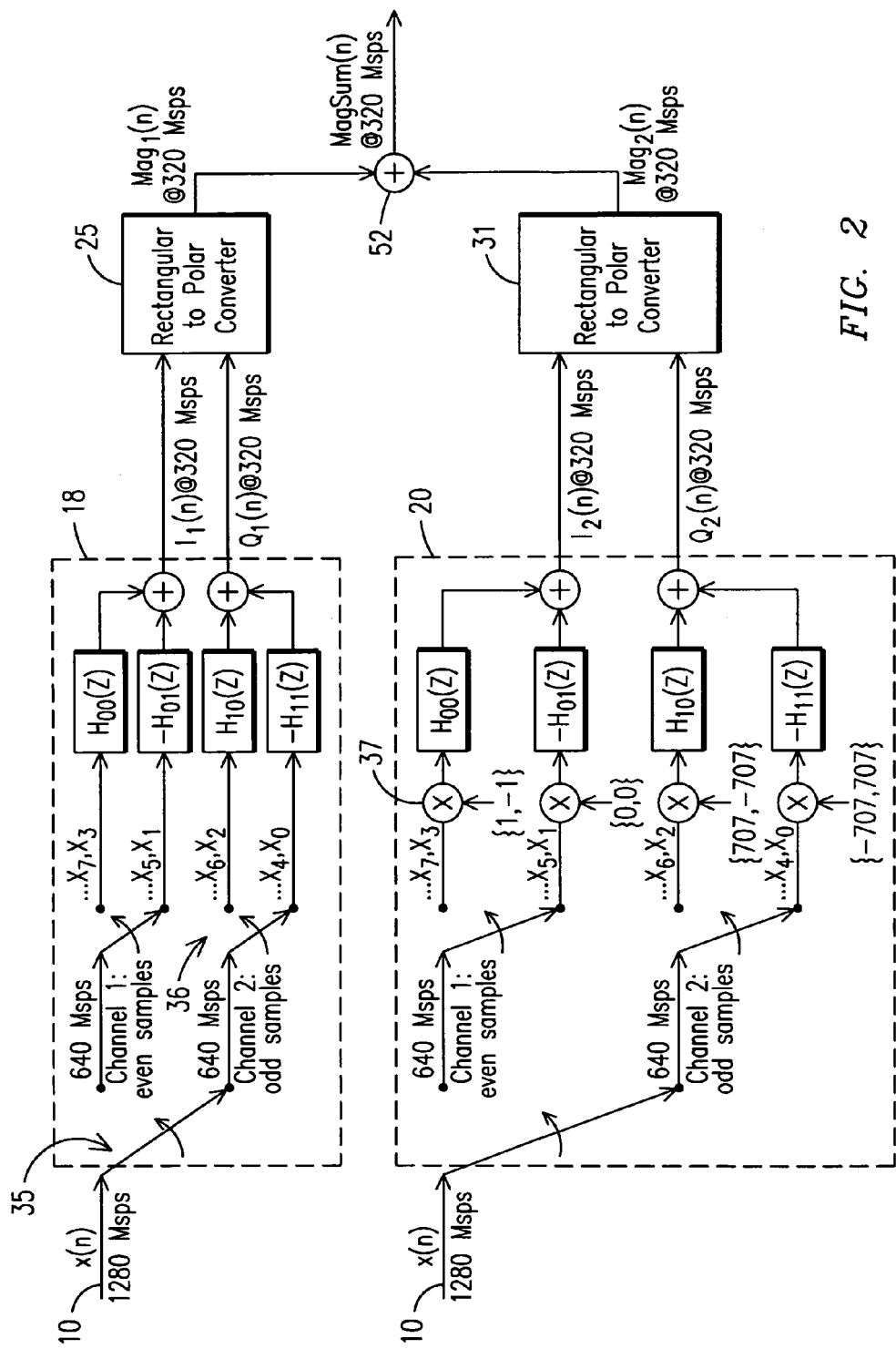
FIG. 2 is a signal path diagram of a dual band rate converter as implemented in a field programmable gate array (FPGA).

The rate conversion as seen in FIG. 2, applies the 1280 Msps signal from line 10 to the rate converter 18 where a demultiplexer or commutator 35 distributes the 1280 Msps signal into two 640 Msps signal lines. The commutator 35 switches the incoming signal back and forth. No samples are thrown out or lost. The rate converter 18 second line, or Channel 2, contains the odd samples of the original 1280 Msps bitstream while the first line, or Channel 1, contains the even samples. Channel 1 is produced by the first commutator 35. The second channel is produced by a second commutator 36 which performs the same function as the first one, in that it distributes the incoming signal into two lower sample rate lines. Now, each of the newly created lines contains every other odd sample. No samples have been thrown out.

Going from left to right in Rate Converter 18, you start out with one 1280 Msps bitstream, then go to two 640 Msps bitstreams, and then four 320 Msps bitstreams. Each of the four 320 Msps lines is unique in the samples it contains. Each of the 320 Msps bitstreams are input to filters: H00(Z), H01(Z), H10(Z), and H11(Z). Every other filter has a −1 in front. In this manner, we can exploit the polyphase structure to mix down a signal by 90 degrees, or, in terms of frequency, 320 MHz (one-fourth of our original sample rate). Now, once the signal is converted to complex 320 Msps, it is input to a rectangular to polar converter 25, which then converts it to magnitude.

Rate Converter 20 is mostly the same as rate converter 18. The difference is that we can no longer exploit the polyphase structure to mix down a signal. For this reason we have to use rotators 37. In the first of the four 320 Msps lines, x3 is followed by x7, and then multiplied by the values in the braces (−1,1). After the rotators 37, x3 get changed to −x3, but x7 stays the same since it gets multiplied by 1. Once the new 320 Msps lines are input into a separate rectangular to polar converter 31, its output is summed with the first rectangular to polar converter 25 output in the magnitude summer 52.

Rate converters 18 and 20 differ in the mixing stage. In converter 18 you can easily mix or downshift in frequency by 320 MHz by multiplying the filters by 1 or −1. In the second rate converter, you cannot easily mix down a signal by 160 MHz. This is because the polyphase structure does not allow a downshift by any arbitrary frequency without adding a new component such as a phase rotator. Thus, the addition of the phase rotators 37.

It should be clear at this time that an ultra-wideband-dual magnitude summer apparatus and method has been provided which advantageously allows the processing of the full wavelength of an ultra-wide band signal. However, it should be clear that the present invention is not to be considered as limited to the forms shown which are to be considered illustrative rather than restrictive.

We claim:

1. An ultra-wideband receiver signal processor for processing a modulated ultra-bandwidth signal comprising:
   first signal rate converter for downshifting the modulated Ultra-wideband received signal to a first downshifted frequency signal;
   second signal rate converter for downshifting the modulated Ultra-wideband received signal to a second downshifted frequency signal;
   a first rectangular to polar converter coupled to the first signal rate converter for converting the first downshifted frequency signal magnitude to a polar magnitude;
   a second rectangular to polar converter coupled to the second signal rate converter for converting the second downshifted frequency signal to polar magnitude;
   a magnitude summer circuit coupled to said first and second rectangular to polar converters for summing the signal magnitudes of the outputs from said first and second rectangular to polar converters; and
   a signal detection and decoding circuit coupled to said magnitude summer circuit for detecting the received ultra-wideband signal;
   thereby facilitating the processing of the entire ultra-wideband bandwidth signal.

2. The ultra-wideband receiver signal processor in accordance with claim 1 in which said first signal rate converter includes a demultiplexer separating odd and even samples into separate processing channels.

3. The ultra-wideband receiver signal processor in accordance with claim 2 in which said second signal rate converter includes a demultiplexer separating odd and even samples into separate processing channels.

4. The ultra-wideband receiver signal processor in accordance with claim 3 in which said first signal rate converter has a second demultiplexer which converts each processing channel into two bitstreams thereby making two pairs of bitstreams from the received modulated signal.

5. The ultra-wideband receiver signal processor in accordance with claim 4 in which said second signal rate converter has a second demultiplexer which converts each processing channel into two bitstreams thereby making two pairs of bitstreams from the received modulated signal.

6. The ultra-wideband receiver signal processor in accordance with claim 5 in which said first signal rate converter has a summer coupled to said second demultiplexer for summing the output bitstreams of said pair of bitstreams, the output of said summer being coupled to said first rectangular to polar converter.

7. The ultra-wideband receiver signal processor in accordance with claim 6 in which said second signal rate converter has a summer coupled to said second demultiplexer for summing the output bitstreams of said pair of bitstreams, the output of said summer being coupled to said second rectangular to polar converter.

8. The ultra-wideband receiver signal processor in accordance with claim 7 in which said first signal rate converter has a plurality of low pass filters.

9. The ultra-wideband receiver signal processor in accordance with claim 8 in which said second signal rate converter has a plurality of low pass filters.

10. The ultra-wideband receiver signal processor in accordance with claim 9 in which said first signal rate converter plurality of low pass filters includes one low pass filter coupled to each second demultiplexer output.

11. The ultra-wideband receiver signal processor in accordance with claim 10 in which said second signal rate converter plurality of low pass filters includes one low pass filter coupled to each second demultiplexer output.

12. A method of processing an Ultra-wideband signal stream comprising the steps of:
    receiving a modulated ultra-wideband signal stream;
    applying the received UWB signal stream to a first signal rate converter for downshifting the UWB signal stream to a first downshifted ultra-wideband frequency signal stream;
    applying the received signal stream to a second signal rate converters for downshifting the UAWB signal stream to a second downshifted ultra-wideband frequency signal stream;
    applying the first downshifted UWB signal to a first rectangular to polar converter and converting the first downshifted ultra-wideband signal to a polar magnitude signal;
    applying the second downshifted UWB signal stream to a second rectangular to polar converter and converting the second downshifted ultra-wideband signal to polar magnitudes;
    magnitude summing the first and second polar magnitude signals from said first and second rectangular to polar converters; and
    detecting the magnitude summed signals; thereby facilitate the processing of the entire ultra-wideband bandwidth signal stream.

13. The method of processing an Ultra-wideband signal in accordance with claim 12 including demultiplexing said UWB signal stream in said first signal rate converter, separating odd and even samples into separate processing channels.

14. The method of processing an Ultra-wideband signal in accordance with claim 13 including demultiplexing said UWB signal stream in said second signal rate converter, separating odd and even samples into separate processing channels.

15. The method of processing an Ultra-wideband signal in accordance with claim 14 including summing said demultiplexed signals from said first rate converter.

16. The method of processing an Ultra-wideband signal in accordance with claim 15 including summing said demultiplexed signals from said second rate converter.

17. The method of processing an Ultra-wideband signal in accordance with claim 16 including the step of converting the magnitudes of said summed signals from said first signal rate converter to polar magnitude signals in a first rectangular to polar converter.

18. The method of processing an Ultra-wideband signal in accordance with claim 17 including the step of converting the magnitudes of said summed signals from said second signal rate converter to polar magnitude signals in a second rectangular to polar converter.

19. The method of processing an Ultra-wideband signal in accordance with claim 18 including the step of magnitude summing the polar magnitude signals from said first and second rectangular to polar converters.

20. A method of processing an Ultra-wideband signal comprising the steps of:
    receiving a modulated ultra-wideband signal;
    applying the received signal to first and second signal channels;
    multiplying the received UWB signal by one set of mixer coefficients in said first signal channel;
    multiplying the received UWB signal by a second set of mixer coefficients in said second signal channel;
    applying the first channel signal to a first rectangular to polar converter to form a first signal having a polar magnitude;
    applying the second channel signal to a second rectangular to polar converter to form a second signal having a polar magnitude;
    summing the magnitude outputs of the first and second rectangular to polar converter signals from said first and second channels; and
    detecting the sum of the signal magnitudes;
to thereby facilitate the processing of the entire ultra-wideband bandwidth.

\* \* \* \* \*